July 3, 1928.
J. C. UMBARGER
1,675,775
APPARATUS FOR THE TREATMENT OF CRUDE OIL
Filed Jan. 18, 1927 2 Sheets-Sheet 1
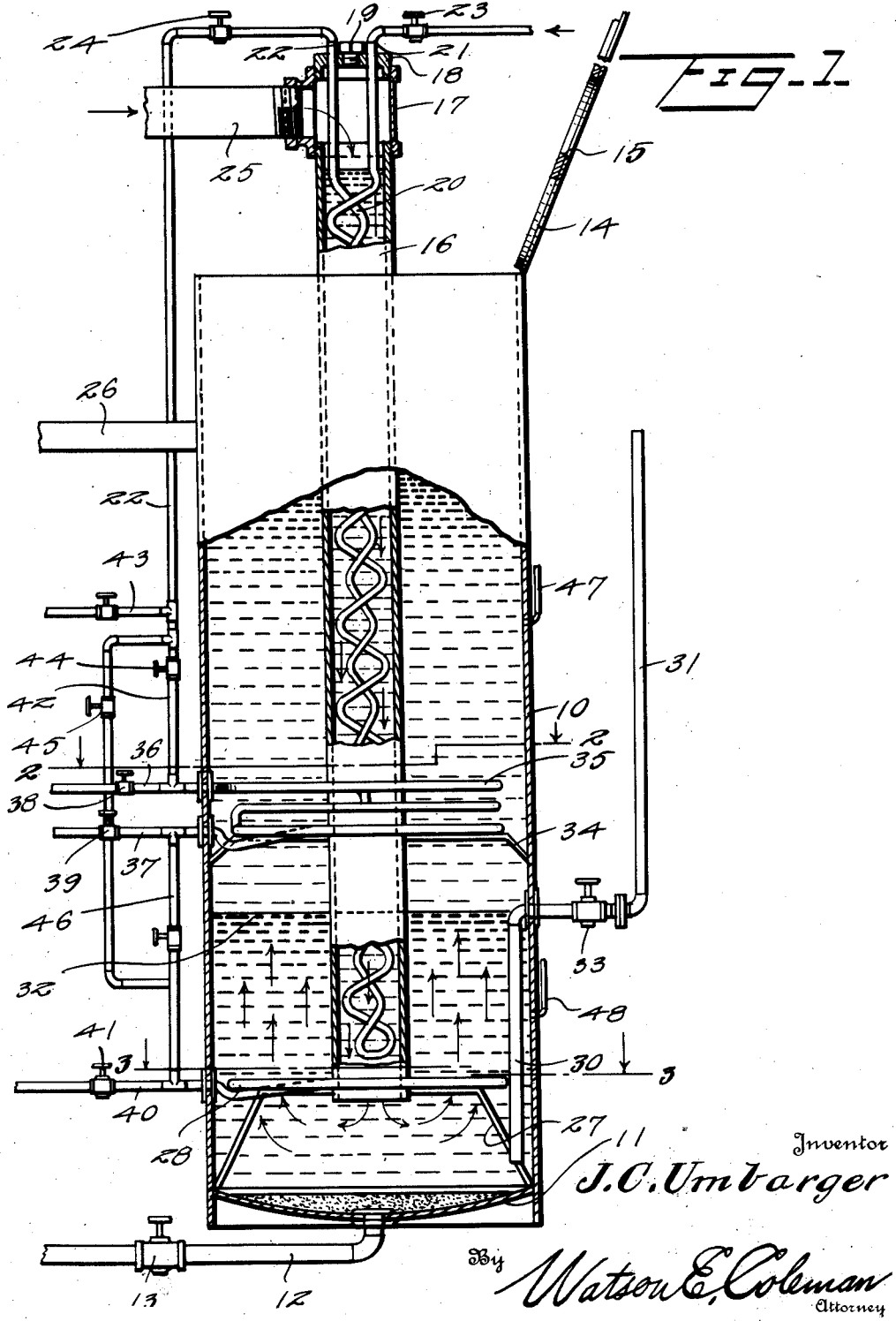
Inventor
J.C. Umbarger
By Watson E. Coleman
Attorney July 3, 1928.
J. C. UMBARGER
1,675,775
APPARATUS FOR THE TREATMENT OF CRUDE OIL
Filed Jan. 18, 1927    2 Sheets-Sheet 2
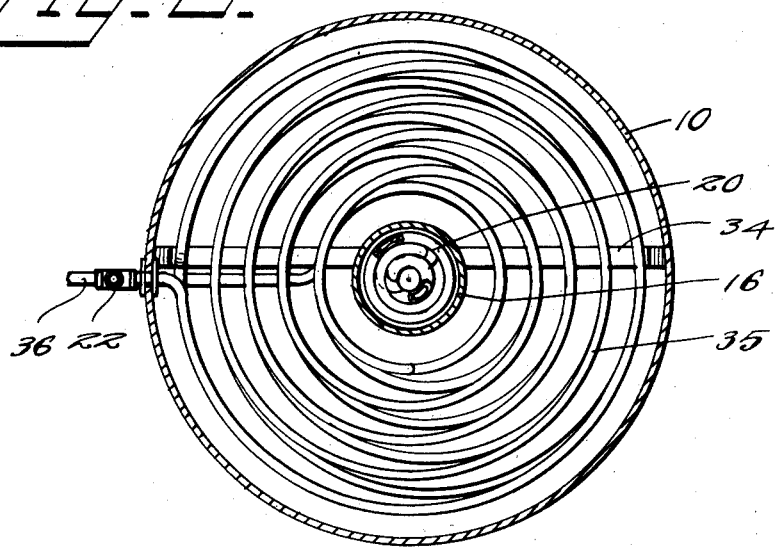
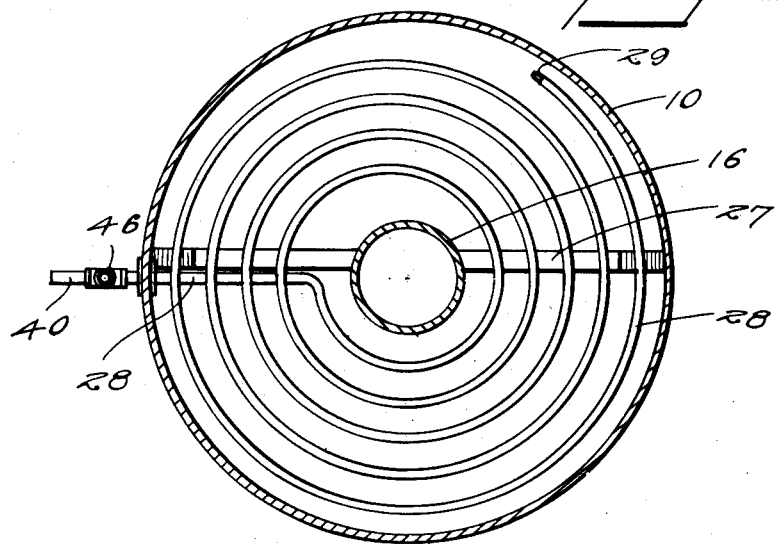
Inventor
J. C. Umbarger
By Watson E. Coleman
Attorney Patented July 3, 1928.

1,675,775

UNITED STATES PATENT OFFICE.

JOSEPH C. UMBARGER, OF CEDAR GROVE, LOUISIANA.

APPARATUS FOR THE TREATMENT OF CRUDE OIL.

Application filed January 18, 1927. Serial No. 161,861.

This invention relates to apparatus for the treatment of crude oil and more particularly to a device for separating basic sediment and water from the oil.

An important object of the invention is to provide a decanter through which the oil may be continuously passed and within which the oil is treated for separation of the water and basic sediment therefrom.

A further and more specific object of the invention is to provide means whereby oil, during its passage through the decanter, is agitated and caused to pass through a body of water so that any contained water therein is extracted, means being provided for heating the body of water, the incoming body of oil, and the oil from which the water and basic sediment have been removed, so that a maximum efficiency of the apparatus may be maintained at all times.

A further object of the invention is to produce a device of this character which will be simple and economical in its construction and operation and durable and practical in service.

These and other objects I attain by the construction shown in the accompanying drawings, wherein for the purpose of illustration is shown a preferred embodiment of my invention and wherein:—

Figure 1 is a vertical sectional view through an apparatus for the treatment of crude oil constructed in accordance with my invention;

Figure 2 is a section on the line 2—2 of Figure 1;

Figure 3 is a section on the line 3—3 of Figure 1.

Referring now more particularly to the drawings, the numeral 10 generally indicates a vertically elongated cylindrical tank having a concave bottom 11 provided with an outlet 12 controlled by a valve 13, the outlet 12 communicating with the bottom at the center thereof. The upper end of the container is provided with a closely fitting cover 14 having a central aperture 15 through which extends a vertically disposed conduit 16, the lower end of which is open and in spaced relation to the bottom 11. Engaging the upper end of the conduit 16 is one arm of the head of a T 17, the opposite arm of which is provided with a cap 18 having a central removable plug 19, the removal of which permits application of a gas separator (not shown). Arranged within the conduit 16 is a steam heating coil 20, the inlet 21 and outlet 22 of which extend through the cap 18 and are suitably valved, as indicated at 23 and 24 respectively. The stem of the T is connected with a conduit 25 leading to a source of oil.

Adjacent its upper end, the tank 10 is provided with an outlet 26. Arranged within the tank immediately above the lower end of the conduit 16 and supported by a suitable bracket 27 is a spiral heating coil 28, the outlet end 29 of which is open and adapted to direct escaping steam circumferentially of the tank, so that it will act upon a contained fluid to cause the same to whirl and at the same time heat the fluid. An outlet pipe 30 is extended through the wall of the tank and is provided with an oscillatory end 31, so that this outlet may have varying levels and serve to maintain a predetermined water level 32 within the tank. This outlet is provided with a valve 33.

Arranged above the water level within the tank and supported by a suitable bracket 34 is a heating coil 35 and the inlet 36 and outlet 37 of which are directed through the walls of the tank and provided with control valves 38 and 39 respectively. The inlet 40 of the heating coil 28 is provided with a valve 41. Each of the inlets 38 and 40 is connected with a suitable source of steam.

The inlet 36 is likewise connected through a valved conduit 42 with the outlet 22 of the coil 20. This outlet 22 has a valve-controlled branch 43, by means of which the exhaust steam from the coil 20 may be discharged between the branch 43 and the valve 44 of the conduit 42. A valved branch conduit 45 connects this conduit leading to the intake 40 of the coil 28. The conduit 45 is further connected to the outlet 37 of the coil 35 by a valved conduit 46.

It will be obvious from the foregoing that a very close regulation of the temperatures of the coils 28 and 35 may be had. These coils may be provided with fresh steam from their intakes and if the temperature thus provided by these coils and determined by thermometers 47 and 48 connected above and below the water level 32 respectively, is found to be excessive, it may be tempered by introducing exhaust steam from the coil 20 by manipulation of the several valves. If the valve 44 is opened and the valve of the outlet branch 43 closed, all of the exhaust from this coil will be passed to the coil 35. If, under these conditions, the valve of the conduit 45 is open, the exhaust from the coil 20 may be passed to both coils 28 and 35. If it is desired that the coil 35 be maintained at a fairly high heat and the coil 28 at a low heat, the valve 44 may be closed and the valve 45 left open. With the valve 41 closed, the coil 28 will be operated on exhaust steam alone. If the exhaust steam from the coil 20 proves insufficient, the valve 39 of the outlet 37 of the coil 35 may be closed and the valve of the conduit 46 opened, so that the exhaust from both coils 20 and 35 is fed to the coil 28. The heat still proving insufficient, the valve 41 may be cracked to permit a small quantity of live steam.

It will be obvious that incoming oil will be heated by the coil 20 and then discharged into the water contained in the lower end of the tank. This water being heated and agitated by the coil 28 will tend to cause precipitation of basic sediment and the separation of water contained in the oil. It will also be obvious that both the water and oil being heated, there will be a certain amount of moisture contained in the oil, which must be driven off if the oil is to be discharged from the outlet 26 in the proper condition. The removal of this dampness is effected by the coil 35 against which the oil, still revolving in the tank through the impetus received from the discharging steam of the coil, is very thoroughly engaged. As the added water extracted from the oil may be continuously removed and the water level thus maintained fixed, it will be obvious that a close regulation of temperatures may be had and the oil thus treated at the temperatures which are most effective.

Since the construction hereinbefore set forth is capable of a certain range of change and modification without materially departing from the spirit of the invention, I do not limit myself to such specific structure except as hereinafter claimed.

I claim:—

1. In apparatus for removing sediment and water from crude oil, a vertically elongated tank having an outlet adjacent its upper end and an oil inlet adjacent its lower end, means for maintaining a predetermined water level within the tank and unitary means below the water level and above the inlet both for heating the water and agitating the same to cause the same to move circumferentially of the tank.

2. In apparatus for removing sediment and water from crude oil, a vertically elongated tank having an outlet adjacent its upper end and an oil inlet adjacent its lower end, means for maintaining a predetermined water level within the tank and a horizontal steam coil within the tank above the level of the inlet and below the water level, said coil having an outlet nozzle directed circumferentially of the tank.

3. In apparatus for removing sediment and water from crude oil, a vertically elongated tank having an outlet adjacent its upper end and an oil inlet adjacent its lower end, means for maintaining a predetermined water level within the tank, a horizontal steam coil within the tank above the level of the inlet and below the water level, said coil having an outlet nozzle directed circumferentially of the tank and a second steam coil within the tank above the water level thereof for heating the contents of the tank.

4. In apparatus for removing sediment and water from crude oil, a vertically elongated tank having an outlet adjacent its upper end and an oil inlet adjacent its lower end, means for maintaining a predetermined water level within the tank, a horizontal steam coil within the tank above the level of the inlet and below the water level, said coil having an outlet nozzle directed circumferentially of the tank, the inlet extending into the tank from the top thereof and a second steam coil within the inlet for heating incoming oil.

5. An apparatus for removing sediment and water from crude oil, a vertically elongated tank having an outlet adjacent its upper end and an oil inlet adjacent its lower end, means for maintaining a predetermined water level within the tank, a horizontal steam coil within the tank above the level of the inlet and below the water level, said coil having an outlet nozzle directed circumferentially of the tank, a second steam coil within the tank above the water level thereof for heating the contents of the tank, the inlet extending into the tank from the top thereof and a third steam coil within the inlet for heating incoming oil.

6. In apparatus for removing sediment and water from crude oil, a vertically elongated tank having an outlet adjacent its upper end and an oil inlet adjacent its lower end, means for maintaining a predetermined water level within the tank, a horizontal steam coil within the tank above the level of the inlet and below the water level, said coil having an outlet nozzle directed circumferentially of the tank, a second steam coil within the tank above the water level thereof for heating the contents of the tank, the inlet extending into the tank from the top thereof, a third steam coil within the inlet for heating incoming oil and means for directing the discharge of the third steam coil into either of the first or second steam coils.

7. In apparatus for removing sediment and water from crude oil, a vertically elongated tank having an outlet adjacent its upper end and an oil inlet adjacent its lower end, means for maintaining a predetermined water level within the tank, a horizontal steam coil within the tank above the level of the inlet and below the water level, said coil having an outlet nozzle directed circumferentially of the tank, a second steam coil within the tank above the water level thereof for heating the contents of the tank, the inlet extending into the tank from the top thereof, a third steam coil within the inlet for heating incoming oil, means for directing the exhaust of the third steam coil to the inlet of the second steam coil and means for directing the exhaust of the second steam coil to the inlet of the first steam coil.

8. In apparatus for removing sediment and water from crude oil, a vertically elongated tank having an outlet adjacent its upper end and an oil inlet adjacent its lower end, means for maintaining a predetermined water level within the tank, a horizontal steam coil within the tank above the level of the inlet and below the water level, said coil having an outlet nozzle directed circumferentially of the tank, a second steam coil within the tank above the water level thereof for heating the contents of the tank, and means for directing the exhaust of the second steam coil to the inlet of the first steam coil.

In testimony whereof I hereunto affix my signature.

JOSEPH C. UMBARGER.